United States Patent [19]

Neuert et al.

[11] Patent Number: 5,589,265
[45] Date of Patent: Dec. 31, 1996

[54] AROMATIC POLYAMIDE STAPLE FIBER BUNDLES OF IMPROVED DISPERSIBILITY IN VISCOUS MATRICES AND PRODUCTION OF FIBER-REINFORCED COMPOSITES

[75] Inventors: Richard Neuert, Winkelhaid; Gerhard Stein, Kelheim, both of Germany

[73] Assignee: Hoechst Aktiengesellschaft, Germany

[21] Appl. No.: 372,366

[22] Filed: Jan. 13, 1995

[30] Foreign Application Priority Data

Jan. 18, 1994 [DE] Germany .................. 44 01 233.0

[51] Int. Cl.$^6$ ..................... D02G 3/00
[52] U.S. Cl. ............ 428/361; 428/290; 428/297; 428/359; 428/391; 428/902
[58] Field of Search ................. 428/359, 361, 428/391, 290, 297, 902

[56] References Cited

U.S. PATENT DOCUMENTS

| | | |
|---|---|---|
| 4,772,328 | 9/1988 | Pfeifer . |
| 4,820,585 | 4/1989 | Tedesco et al. . |
| 4,944,965 | 7/1990 | Luxon et al. .................. 427/389.7 |
| 4,968,560 | 11/1990 | Lechner et al. . |
| 4,974,522 | 12/1990 | Holden et al. . |
| 5,002,637 | 3/1991 | Toyoshima et al. ............ 162/137 |
| 5,334,441 | 8/1994 | McGarry et al. ............ 428/229 |

FOREIGN PATENT DOCUMENTS

| | | |
|---|---|---|
| 0235577 | 9/1987 | European Pat. Off. . |
| 0271825 | 6/1988 | European Pat. Off. . |
| 0347540 | 12/1989 | European Pat. Off. . |
| 0387825 | 9/1990 | European Pat. Off. . |
| 0606859 | 7/1994 | European Pat. Off. . |
| 4238667 | 1/1994 | Germany . |
| 4300626 | 7/1994 | Germany . |

*Primary Examiner*—James J. Bell
*Attorney, Agent, or Firm*—Connolly & Hutz

[57] ABSTRACT

Aromatic polyamide staple fiber bundles of improved dispersibility in viscous matrices and production of fiber-reinforced composites Described are bundles of aromatic polyamide staple fibers having a staple length of at least 1 mm which have been provided with an effective amount of an agent which enhances the cohesion of the fiber bundle.

The staple fiber bundles are held together by the adhesive before mixing into a matrix material and separate into individual fibers on mixing into the matrix material. There is no need for special mixing apparatus.

12 Claims, No Drawings

AROMATIC POLYAMIDE STAPLE FIBER BUNDLES OF IMPROVED DISPERSIBILITY IN VISCOUS MATRICES AND PRODUCTION OF FIBER-REINFORCED COMPOSITES

DESCRIPTION

Aromatic polyamide staple fiber bundles of improved dispersibility in viscous matrices and production of fiber-reinforced composites The present invention relates to bundles of staple fibers composed of aromatic polyamides (hereinafter also called aramids) and to a process for producing fiber-reinforced composites.

It is known that mixing short synthetic fibers into viscous matrices, such as concrete or mortar, presents problems. Unless special measures are taken, it is usual for clumping to occur; that is, the fiber bundles do not disperse sufficiently, if at all, and remain in the matrix and thus in the composite later produced therefrom. Undispersed bundle is generally not desirable, since it gives rise to regions of weakness in the composite material.

Various ways have already been tried to improve the dispersion of fiber bundles on mixing into such matrices. For instance, special mixing apparatus can be used; this solution is frequently machine- and time-intensive and accordingly cost-intensive.

It is also already known to treat the fiber bundles with an adhesive which holds the bundle together before it is mixed in and, on mixing in, allows the bundle to be dispersed using conventional mixing apparatus. For instance, EP-A-235,577 describes acrylic fiber bundles having such a property profile. Aramid staple fiber bundles thus treated have not been described before.

It has now been found that the treatment of staple fibers of a certain staple length with an adhesive leads to fiber bundles which have the above-described desired property profile. The fiber bundles of the present invention are particularly readily mixed into viscous matrices, separating into individual fibers, using conventional mixers.

The present invention accordingly provides a bundle of aromatic polyamide staple fibers having a staple length of at least 1 mm which have been treated with an effective amount of an agent which enhances the cohesion of the fiber bundle.

The aramid fibers to be used according to the present invention can be fibers composed of any desired aromatic polyamide. The aromatic polyamide in question can be a homopolymer or preferably a copolymer.

Examples of homopolymers are poly(paraphenyleneterephthalamide) and poly(meta-phenyleneisophthalamide).

The fibers to be used preferably comprise aromatic polyamides, especially aromatic copolyamides, which are soluble in organic polar aprotic solvents.

A soluble aromatic polyamide for the purposes of this invention is any aromatic polyamide which has a solubility in N-methylpyrrolidone of at least 50 g/l at 25° C.

The polar aprotic organic solvent preferably comprises at leas t one solvent of the amide type, for example N-methyl-2-pyrrolidone, N,N-dimethylacetamide, tetramethylurea, N-methyl-2-piperidone, N,N'-dimethylethyleneurea, N,N,N',N'-tetramethylmaleamide, N-methylcaprolactam, N-acetylpyrrolidine, N,N-diethylacetamide, N-ethyl-2-pyrrolidone, N,N'-dimethylpropionamide, N,N-dimethylisobutylamide, N-methylformamide, N,N'-dimethylpropyleneurea. The preferred organic solvents for the process of the present invention are N-methyl-2-pyrrolidone, N,N-dimethylacetamide and a mixture thereof.

Preference is given to using aromatic copolyamide fibers which form isotropic solutions in polar aprotic organic solvents and which contain at least two, in particular three, different structural repeat units which differ in the diamine units.

Preferably the aramid is a polymer with the structural repeat units of the formulae I, II and optionally III

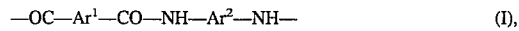
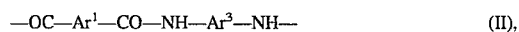
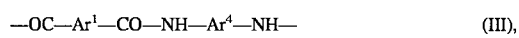

where $Ar^1$, $Ar^2$, $Ar^3$ and $Ar^4$ are each independently of the others a bivalent monocyclic or polycyclic aromatic radical whose free valences are disposed para or meta or comparably parallel, coaxial or angled to each other, and $Ar^2$, $Ar^3$ and, if present, $Ar^4$ each have different individual meanings within the scope of the given definitions, and the respective monomer components underlying the polymer are selected so as to produce an aromatic polyamide which forms isotropic solutions in organic solvents.

Any bivalent aromatic radicals whose valence bonds are disposed para or comparably coaxial or parallel to each other are monocyclic or polycyclic aromatic hydrocarbon radicals or heterocyclic aromatic radicals which can be monocyclic or polycyclic. Heterocyclic aromatic radicals have in particular one or two oxygen, nitrogen or sulfur atoms in the aromatic nucleus.

Polycyclic aromatic radicals can be fused to one another or be bonded linearly to one another via C—C bonds or via —CO—NH— groups.

The valence bonds in mutually coaxial or parallel disposition point in opposite directions. An example of coaxial bonds pointing in opposite directions are the biphenyl-4,4'-ylene bonds. An example of parallel bonds pointing in opposite directions are the naphthylene-1,5 or -2,6 bonds, whereas the naphthylene-1,8 bonds are parallel but point in the same direction.

Examples of preferred bivalent aromatic radicals whose valence bonds are disposed para or comparably coaxial or parallel to each other are monocyclic aromatic radicals having free valences disposed para to each other, especially 1,4-phenylene, or bicyclic fused aromatic radicals having parallel bonds pointing in opposite directions, especially 1,4-, 1,5- and 2,6-naphthylene, or bicyclic aromatic radicals linked by a C—C bond and having coaxial bonds pointing in opposite directions, especially 4,4'-biphenylylene.

Any bivalent aromatic radicals whose valence bonds are disposed meta or comparably angled to each other are monocyclic or polycyclic aromatic hydrocarbon radicals or heterocyclic aromatic radicals which can be monocyclic or polycyclic. Heterocyclic aromatic radicals have in particular one or two oxygen, nitrogen or sulfur atoms in the aromatic nucleus.

Polycyclic aromatic radicals can be fused to one another or be bonded to one another via C—C bonds or via bridging groups such as —O—, —CH$_2$—, —S—, —CO— or —SO$_2$—.

Examples of preferred bivalent aromatic radicals whose valence bonds are disposed meta or comparably angled to each other are monocyclic aromatic radicals having free valences disposed meta to each other, especially 1,3-phenylene, or bicyclic fused aromatic radicals having mutually angled bonds, especially 1,6- and 2,7-naphthylene, or bicyclic aromatic radicals linked via a C—C bond but having mutually angled bonds, especially 3,4'-biphenylylene.

Minor portions, for example up to 5 mol %, of the monomer units, based on the polymer, can be aliphatic or cycloaliphatic in nature, for example alkylene or cycloalkylene units.

Alkylene is to be understood as meaning branched and especially straight-chain alkylene, for example alkylene having two to four carbon atoms, especially ethylene.

Cycloalkylene radicals are for example radicals having five to eight carbon atoms, especially cycloalkylene.

All these aliphatic, cycloaliphatic or aromatic radicals can be substituted by inert groups. These are substituents which have no adverse effect on the contemplated application.

Examples of such substituents are alkyl, alkoxy or halogen.

Alkyl is to be understood as meaning branched and especially straight-chain alkyl, for example alkyl having one to six carbon atoms, such as ethyl, n-propyl, n-butyl, n-pentyl or n-hexyl and especially methyl.

Alkoxy is to be understood as meaning branched and especially straight-chain alkoxy, for example alkoxy having one to six carbon atoms, such as ethoxy, n-propoxy, n-butoxy, n-pentoxy or n-hexoxy and especially methoxy.

Halogen is for example fluorine, bromine or in particular chlorine.

Preference is given to aromatic polyamides based on unsubstituted radicals.

The dicarboxylic acid unit in the aromatic polyamides comprising the structural repeat units of the formulae I, II and optionally III is preferably terephthalic acid.

Examples of preferred diamine combinations from which these preferred structural repeat units of the formulae I, II and III are derived are 1,4-phenylenediamine, 4,4'-diaminodiphenylmethane and 3,3'-dichloro-, 3,3'-dimethyl- or 3,3'-dimethoxybenzidine; also 1,4-phenylenediamine, 1,4-bis(aminophenoxy)benzene and 3,3'-dichloro-, 3,3'-dimethyl- or 3,3'-dimethoxybenzidine; and also 1,4-phenylenediamine, 3,4'-diaminodiphenyl ether and 3,3'-dichloro-, 3,3'-dimethyl- or 3,3'-dimethoxybenzidine; and also 1,4-phenylenediamine, 3,4'-diaminodiphenyl ether and 4,4'-diaminobenzanilide; and also 1,4-phenylenediamine, 1,4-bis(aminophenoxy)benzene and 3,4'-diaminodiphenyl ether.

Aramids which are derived from such diamine combinations and which are preferable for use according to the present invention are described in EP-A-199,090, EP-A-364,891, EP-A-364,892, EP-A-364,893 and EP-A-424,860. Their processing into filaments is also described there.

The aromatic polyamides to be used according to the present invention are known per se and can be prepared by methods known per se.

Preference is given to using aromatic polyamides with the above-defined structural repeat units of the formulae I, II and optionally III where $Ar^1$ is a bivalent monocyclic or polycyclic aromatic radical whose free valences are disposed para or comparably parallel or coaxial to each other, $Ar^2$ is a bivalent monocyclic or polycyclic aromatic radical whose free valences are disposed para or comparably parallel or coaxial to each other, $Ar^3$ is a radical of the formula IV

$$—Ar^5—X—Ar^6— \quad (IV),$$

where $Ar^5$ and $Ar^6$ are independently of each other a bivalent monocyclic or polycyclic aromatic radical whose free valences are disposed para or comparably parallel or coaxial to each other or where $Ar^6$ additionally is a bivalent monocyclic or polycyclic aromatic radical whose free valences are disposed meta or comparably angled to each other, X is a group of the formula —O—, —S—, —SO$_2$—, —O-phenylene-O— or alkylene, and where $Ar^4$ has one of the meanings defined for $Ar^2$ or $Ar^3$ but differs from the particular $Ar^2$ or $Ar^3$ of a molecule.

Particularly preferred aramids of this type are polymers where $Ar^1$ is 1,4-phenylene, $Ar^2$ is 1,4-phenylene or a bivalent radical of 4,4'-diaminobenzanilide, $Ar^5$ and $Ar^6$ are each 1,4-phenylene, X is —O—, —CH$_2$— or —O-1,4-phenylene-O—, and $Ar^4$ is a bivalent radical of 3,4'-diaminodiphenyl ether, of 3,3'-dichlorobenzidine, of 3,3'-dimethylbenzidine or of 3,3'-dimethoxybenzidine.

The staple fibers to be used according to the present invention can be obtained by any conventional process, for example by the wet spinning process. The production of the staple fibers to be used according to the present invention can be effected in a conventional manner by cutting filaments to size on known cutting apparatus.

Trials have shown that the staple fibers must have a minimum staple length of 1 mm to give the desired property profile.

Usually the fibers to be used according to the present invention have a staple length of 1 to 48 mm, preferably 3 to 16 mm, especially 3 to 10 mm.

Their fiber linear density is usually more than 1.0 dtex, preferably 1.5 to 20 dtex.

The cross section of the aramid fibers to be used according to the present invention can be optional, for example triangular, tri- or multilobal or, in particular, round.

The aramid fibers to be used according to the present invention are customarily high tenacity types. Such fibers generally have a tenacity (measured to DIN 53816) of more than 100 cN/tex, preferably 140 to 290 cN/tex. Depending on the linear density, it is also possible for higher tenacity values to occur.

Particular preference is given to using high strength, high modulus aramid fiber types; for example fibers having a tenacity of 140 to 290 cN/tex and an initial modulus (measured to DIN 53816), based on 100% extension, of more than 25N/tex, preferably 40 to 130N/tex.

Such fiber types preferably have breaking extensions (measured to DIN 53816) of 0.5 to 10%, especially 2 to 6%.

The agent which enhances the cohesion of the fiber bundle is customarily applied to the fibers in an amount of 0.1 to 5.0% by weight. Preferred amounts of this agent range from 0.3 to 3.0% by weight, based on the fiber bundle. Particular preference is given to using 0.5 to 3.0% by weight of the agent.

The agent to be used according to the present invention is not subject to any restrictions as regards its chemical composition. It may comprise individual components or combinations of preparations which ensure the bundling of individual filaments according to the present invention to improve mixability.

Examples of a type of suitable preparations are agents which are soluble or swellable in water. Examples thereof are modified cellulose derivatives, such as carboxymethylcellulose; or water-soluble alkali silicates, such as sodium silicate; or water-soluble polymers, such as polyvinyl alcohol; or water-emulsifiable preparations, such as tallow fat derivatives, especially tallow fat alcohol triphosphates.

Examples of a further type of suitable preparations are agents which are soluble in organic solvents. Examples thereof are polyurethane resins and organosilane adhesion promoters.

These types of adhesives are known per se and described for example in Ullmann's Encyclopädie der technischen Chemie, 4th revised and enlarged edition, volume 21, pages 409–414 and 496–500, Verlag Chemie (1980).

The water-soluble alkali metal silicate used is particularly preferably a sodium silicate which usually contains 2 to 4 mol of $SiO_2$ per mole of alkali metal oxide.

The organosilane adhesion promoter is preferably a compound of the formula I $$X-(CH_2)_n-Si-(Y)_3 \quad (I),$$

where n is an integer from 1 to 5, especially 3, X is a group of the formula $-COOR^1$, $-CN$, $-(CH_2)_m-NR^2R^3$ or halogen, Y is alkyl, alkoxy or halogen, $R^1$, $R^2$ and $R^3$ are independently of one another hydrogen, alkyl, cycloalkyl, aryl or aralkyl, and m is an integer from 0 to 5, especially 2.

Particular preference is given to treating aramid fibers with organosilane adhesion promoters of the above-defined formula I where X is a group of the formula $-(CH_2)_m-NR^2R^3$ where $R^2$ and $R^3$ are independently of each other hydrogen or $C_1$–$C_6$alkyl, Y is $C_1$–$C_6$alkyl or especially $C_1$–$C_6$alkoxy, and m is 0 or 2.

Alkyl generally comprises the above-described branched or especially straight-chain alkyl radicals. Methyl is preferred.

Alkoxy generally comprises the above-described branched or especially straight-chain alkoxy radicals. Methoxy is preferred.

Cycloalkyl generally comprises radicals having five to eight ring carbon atoms, especially cyclohexyl.

Aryl generally comprises mono- or polycyclic carbocyclic aromatic radicals which may be fused or anellated, especially phenyl.

Aralkyl customarily comprises radicals having seven to nine carbon atoms, especially benzyl.

Halogen generally comprises the above-described halogen radicals; chlorine is preferred.

The fiber bundles of the present invention are used with preference for producing composite materials. The process for producing these composite materials comprises the steps of a) presenting a viscous matrix material, preferably a finely divided matrix material in dry or moist form, in a mixing apparatus, b) adding an effective amount of a reinforcing material in the form of the staple fiber bundle defined above, and c) mixing said reinforcing material into said matrix material.

The use of the staple fiber bundles of the present invention in the above-defined process also forms part of the subject-matter of the present invention.

The staple fiber bundles of the present invention can be used mixed with inorganic and/or organic viscous matrix materials.

As used herein, the term "viscous matrix material" is to be understood as meaning materials whose viscosity is so high that the use of conventional short fibers and of conventional mixing apparatus is likely to result in appreciable clumping of the mixture.

Examples of organic matrix materials are viscous plastics, i.e. heated thermoplastics or thermosets, into which the staple fiber bundles of the present invention are to be mixed and dispersed as uniformly as possible.

Examples of inorganic matrix materials are air- and/or water-setting mixtures of inorganic materials, in particular hydraulically setting materials. The fiber bundles of the present invention are preferably used in mixtures with mortar, concrete, cement, gypsum or organic sealing compositions, i.e. building material compositions in the broadest sense.

The present invention also relates to the use of the staple fiber bundles for these purposes.

The mixing of the staple fiber bundles of the present invention into the matrix material can be by conventional mixing apparatus. Examples are customary forced-circulation, ploughshare and other such mixers.

The matrix material can be present in a finely divided form, as in the form of a granulation, a powder or a dust, or in the form of a viscous melt. Preferably it is in the form of a finely divided inorganic material. The mixing of the staple fiber bundles into finely divided inorganic material can take place in the dry or in the moist state.

In a further preferred embodiment, the aramid staple fiber bundles of the present invention are mixed into matrix materials which are used in injection or extrusion molding processes.

What is claimed is:

1. A staple fiber bundle comprising aromatic polyamide staple fibers having a staple length of at least 1 mm, wherein the staple fibers have been treated with an effective amount of an agent which enhances the cohesion of the fiber bundle, and wherein the fiber bundle cohesion enhancing agent is a modified cellulose derivative, a water-soluble alkali metal silicate, a water-soluble polymer, a tallow fat derivative, a polyurethane resin, or an organosilane adhesion promoter of the formula $$X-(CH_2)_n-Si(Y)_3$$

herein n is a number from 1 to 5, X is $-COOR^1$ or $-CN$, Y is alkyl, alkoxy, or halogen, and $R^1$ is alkyl, cycloalkyl, aryl, or aralkyl.

2. The staple fiber bundle of claim 1 wherein the aromatic polyamide is poly(paraphenyleneterephthalamide) or poly(meta-phenylene isophthalamide).

3. The staple fiber bundle of claim 1 wherein the aromatic polyamide is an aromatic copolyamide which is soluble in organic polar aprotic solvents.

4. The staple fiber bundle of claim 3 wherein the aromatic copolyamide is a polymer with the structural repeat units of the formulae I, II and optionally III $$-OC-Ar^1-CO-NH-Ar^2-NH- \quad (I),$$

$$-OC-Ar^1-CO-NH-Ar^3-NH- \quad (II),$$

$$-OC-Ar^1-CO-NH-Ar^4-NH \quad (III),$$

where $Ar^1$, $Ar^2$, $Ar^3$ and $Ar^4$ are each, independently of the others, a bivalent monocyclic or polycyclic aromatic radical whose free valances are disposed para or meta or comparably parallel, coaxial or angled to each other, and the bivalent monocyclic or polycyclic radicals $Ar^2$, $Ar^3$ and, if present, $Ar^4$ are each independently selected so as to be different from one another, and the respective monomer components underlying the polymer are selected so as to produce an aromatic polyamide which forms isotropic solutions in organic solvents.

5. The staple fiber bundle of claim 4 wherein $Ar^1$ is a bivalent monocyclic or polycyclic aromatic radical whose free valences are disposed para or comparably parallel or coaxial to each other, $Ar^2$ is a bivalent monocyclic or polycyclic aromatic radical whose free valances are disposed para or comparably parallel or coaxial to each other, $Ar^3$ is a radical of the formula IV $$-Ar^5-X-Ar^6- \quad (IV),$$

where $Ar^5$ and $Ar^6$ are independently of each other a bivalent monocyclic or polycyclic aromatic radical whose free valances are disposed para or comparably parallel or coaxial to each other or where $Ar^6$ additionally is a bivalent monocyclic or polycyclic aromatic radical whose free valences are disposed meta or comparably angled to each other, X is a group of the formula —O—, —S—, —SO$_2$—, —O-phenylene-O— or alkylene, and where $Ar^4$ has one of the meanings defined for $Ar^2$ or $Ar^3$ but differs from the particular $Ar^2$ or $Ar^3$ of a molecule.

6. The staple fiber bundle of claim 4 wherein $Ar^1$ is 1,4-phenylene, $Ar^2$ is 1,4-phenylene or a bivalent radical of 4,4'-diaminobenzanilide, $Ar^5$ and $Ar^6$ are each 1,4-phenylene, X is —O—, —CH$_2$— or —O-1,4-phenylene-O— and $Ar^4$ is a bivalent radical of 3,4'-diaminodiphenyl ether, of 3,3'-dichloro-benzidine, of 3,3'-dimethylbenzidine or of 3,3'-dimethoxybenzidine.

7. The staple fiber bundle of claim 1 wherein the staple fibers have a staple length of 3 to 16 mm.

8. The staple fiber bundle of claim 1 wherein the staple fibers have a fiber linear density of 1.5 to 20 dtex.

9. The staple fiber bundle of claim 1 wherein the fiber bundle cohesion enhancing agent is present on the fibers in an amount of 0.3 to 3.0% by weight.

10. The staple fiber bundle of claim 1 wherein the water-soluble alkali metal silicate is a sodium silicate containing 2 to 4 mol of SiO$_2$ per mole of alkali metal oxide.

11. The staple fiber bundle of claim 1, wherein the fiber bundle cohesion enhancing agent is carboxymethylcellulose, an alkali metal silicate, polyvinyl alcohol, or a tallow fat alcohol triphosphate.

12. The staple fiber bundle of claim 11, wherein the fiber bundle cohesion enhancing agent is an alkali metal silicate.

* * * * *